United States Patent Office 3,578,718
Patented May 11, 1971

3,578,718
PROCESS FOR THE PREPARATION OF ISOMERIC MIXTURES OF DI-THIO-BENZENE COMPOSED ESSENTIALLY OF THE PARA ISOMER
Max Schmidt, Wurzburg, Germany, assignor to Research Corporation, New York, N.Y.
No Drawing. Filed May 17, 1968, Ser. No. 729,915
Claims priority, application France, May 19, 1967, 107,109
Int. Cl. C07c 149/32
U.S. Cl. 260—609      4 Claims

ABSTRACT OF THE DISCLOSURE

A process for producing di-thio-benzene is disclosed, wherein polyphenylene-disulfide is subjected to the action of a reducing agent, and the resultant compound is acidified to produce the free mercaptan.

BACKGROUND OF THE INVENTION

The processes for the preparation of di-thio-benzene known up to now are difficult to put into use and only allow the synthesis of these compounds with very reduced yields.

Thus, in the preparation of di-thio-benzene, the reduction by zinc in HCl of the benzo-di-sulfochloride corresponding to the di-thio-benzene, has been used. This method of preparation necessitates the use of compounds of intermediary reactions that are the benzo-disulfochlorides. Now, among these benzo-di-sulfochlorides, only the meta isomer is easy to obtain. The ortho and para isomers of di-thio-benzene, that present the greatest practical interest, are not readily obtainable by the above method of preparation, which applies particularly to the obtainment of meta-di-thio-benzene.

SUMMARY OF THE INVENTION

A mixture of three isomers of di-thio-benzene is prepared by subjecting polyphenylene-disulfide to the action of a reducing agent, such as an alkali metal or an alkaline earth metal, in an inert solvent. The product obtained by the reduction of the polyphenylene-disulfide is acidified to produce the free mercaptan. The various isomers may be isolated by extraction and separation, generally with the use of an appropriate solvent.

DETAILED DESCRIPTION OF THE INVENTION

The present invention concerns a new process for the preparation of compounds of formula:

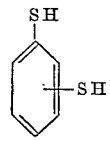

known as benzo-di-thiol or di-thio-benzene.

The compounds answering to this formula correspond to the three isomers ortho-di-thio-benzene, meta-di-thio-benzene, and para-dithiobenzene.

The present invention allows the preparation of a mixture of the three isomers of di-thio-benzene by a simple process leading to some notable quantities of each of the isomers.

According to the present invention, di-thio-benzene is prepared by reacting a reducing agent with polyphenylene-disulfide. The polyphenylene-disulfide is a polymer containing a linear chain of benzene nuclei interconnected by disulfide bridges. The intermediate product obtained by this reaction is acidified to produce the desired di-thio-benzene.

The polyphenylene-disulfide may be represented diagrammatically by the formula:

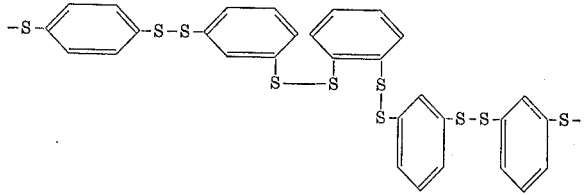

from which can be clearly seen that the two disulfide links, fixed on the same benzene nucleus, can exist in the same micromolecular chain in the position ortho, meta or para.

The reduction of the disulfide links of these polymers allows the production of all three isomers—ortho, meta and para—of di-thio-benzene.

The polymer polyphenylene-disulfide can be obtained by means of the process described in French Pat. No. 1,425,660 by the present applicant. This process is characterized by the fact that a suitable amount of elemental sulphur at elevated temperature and pressure reacts with a halogenated aromatic hydrocarbon.

Preferably, the reduction of the polyphenylene-disulfide is by means of a metal reductor, and most preferably the reduction is by way of an alkaline metal or alkaline-earth metal, such as, for instance, sodium, lithium, potassium, calcium or magnesium. The reduction is generally conducted in an inert solvent, i.e., a solvent which is not attacked by the metal reductor and does not react with the polyphenylene-disulfide. All inert solvents may be utilized in the practice of the present invention, as long as such solvents do not enter into the reaction. For instance, the phosphoric hexamethylated triamide of the formula:

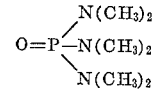

may be utilized. Preferably, however, the inert solvent is liquid ammonia.

Preferably, the amount of metal reductor used to reduce the disulfide links of the polyphenylene-disulfide polymer is from about 2- to about 4-gram equivalent moles per gram equivalent mole of disulfide linkages in the polymer. Preferably, the metal reductor is used in an amount of between 4- and 7-gram equivalent moles per liter of reaction medium (reducing solution).

The process of the present invention may be practiced at atmospheric pressures, or at higher or lower pressures, and at temperatures of −60° C. to −40° C., preferably −45° C. to −55° C.

The process of the present invention is not influenced in a determinant way by the temperature at which the reaction is effected. In fact, the speed of reaction is limited by the speed of attack of the polyphenylene-disulfide polymers which are generally insoluble in the reactive medium that the metal reductor solution constitutes. The attack of the polymer is therefore made by its surface and the reaction is even quicker than the reducing polymers find in a more divided state.

The product obtained by reduction of poly-phenylene-disulfide with the help of a metal reductor is changed to free mercaptan by the action of an acid in the usual manner. For this purpose, all usual nonoxidising acids are used, such as HCl, dilute sulphuric acid, acetic acid, etc. The extraction and the separation of the isomers from the di-thio-benzene is likewise done in a conventional way, e.g., by extraction with the help of an appropriate solvent followed by evaporation of the solvent and fractionation under reduced pressure.

The acidulation of the product obtained by the reduction of polyphenylene-disulfide may be conducted at temperatures of 10° C. to 50° C., or at higher or lower temperatures. Generally, about 2- to 5-gram equivalents of the nonoxidising acid will be used per mole of di-thio-benzene produced.

Before further clarifying the invention, various examples of its putting into effect will be described now by virtue of illustration and with no restrictive character.

Example I

In a 1 liter flask containing one handful of small balls of hard porcelain, ½ liter of ammonia gas is condensed by cooling. Then 50 g. of polyphenylene-disulfide and 20 g. of sodium are added in small quantities. This is left to react for 6 hours at a temperature between —45° and —55° in the flask which is slanted and rotating. Then the ammonia is expelled by reheating, and the excess of sodium is destroyed with the water by placing the open flask in a desiccator connected to a vacuum pump.

The product obtained during the reaction dissolves in the water and, by acidification, gives the corresponding thiols which are carried in the ether. After dissolving the reaction product in 500 grams of water, 50 grams of hydrochloric acid are added at room temperature and the product is acidified for about 10 minutes or until acidification is complete.

By distillation of the etheral fraction containing the di-thio-benzene, a fraction is obtained between 115 and 118° C. under 12 mm. of pressure containing 17.4 g., i.e. 35% of the theoretic quantity, of the mixture of di-thiobenzenes.

A magnetic spectrum of resonance makes it possible to establish that the mixture contains nearly half of the isomer para and ¼ of each of the isomers ortho and meta.

Likewise, as a secondary product, 19.2 g. of thiophenol are obtained.

Example II

In proceeding in a manner similar to that described under Example I, the reduction of the polyphenylene-disulfide is effected with 6 g. of lithium dissolved in ½ a liter of liquid ammonia, and the reaction is conducted under an atmosphere of argon.

By this process, 17 g. of the di-thio-benzene mixture is obtained and the amount of secondary product obtained is reduced to 13 g. of thiophenol.

What is claimed is:

1. A process for producing a di-thiol-benzene isomeric mixture composed essentially of the para isomer, said process comprising reducing polyphenylene-disulfide by reaction at —60° to —40° C. with a reducing agent selected from the group consisting of alkaline metals and alkaline-earth metals in liquid ammonia and thereafter subjecting the resultant product to acidification with a nonoxidizing acid.

2. The process of claim 1, wherein said reducing agent is selected from the group consisting of sodium, lithium, potassium, calcium and magnesium.

3. The process as claimed in claim 1, wherein from about 2- to about 4-gram equivalents of reducing agent are present in the reaction mixture per gram equivalent of disulfide linkages in the polymer.

4. The process as claimed in claim 1, wherein the reaction medium contains 4- to 7-gram equivalents of reducing agent per liter.

References Cited

UNITED STATES PATENTS

| 3,133,972 | 5/1964 | Handlovits et al. | 260—609 |
| 3,275,694 | 9/1966 | Hahn et al. | 260—609 |
| 3,461,168 | 8/1969 | Laufer | 260—608 |

OTHER REFERENCES

Reid: "Chem. Bivalent Sulfur," vol. I (1958), pp. 36–37.

Houben-Weyl: "Met. der. Org. Chemie," vol. 9 (1955), pp. 24–25.

CHARLES B. PARKER, Primary Examiner

D. R. PHILLIPS, Assistant Examiner

U.S. Cl. X.R.

260—608